(12) United States Patent
Zwegers et al.

(10) Patent No.: US 12,030,468 B2
(45) Date of Patent: Jul. 9, 2024

(54) FAN TO DECELERATE VEHICLE AND PROVIDE COOLING TO FRICTION BRAKES

(71) Applicant: Toyota Motor Engineering & Manufacturing North America, Inc, Plano, TX (US)

(72) Inventors: Corey Zwegers, Dexter, MI (US); Robert C. MacArthur, Ypsilanti, MI (US); Rachel M. Menchak, Saline, MI (US); Claudia A. Ma, Northville, MI (US); Shigenori Shibata, Ann Arbor, MI (US); Adam R. VanAntwerp, Chelsea, MI (US)

(73) Assignee: TOYOTA MOTOR ENGINEERING & MANUFACTURING NORTH INC, Plano, TX (US)

( * ) Notice: Subject to any disclaimer, the term of this patent is extended or adjusted under 35 U.S.C. 154(b) by 552 days.

(21) Appl. No.: 17/323,494

(22) Filed: May 18, 2021

(65) Prior Publication Data

US 2022/0371558 A1 Nov. 24, 2022

(51) Int. Cl.
*B60T 1/087* (2006.01)
*B60T 1/06* (2006.01)
*B60T 8/171* (2006.01)
*B60T 17/22* (2006.01)
*F16D 65/02* (2006.01)
(Continued)

(52) U.S. Cl.
CPC .............. *B60T 1/087* (2013.01); *B60T 1/065* (2013.01); *B60T 8/171* (2013.01); *B60T 17/221* (2013.01); *F16D 65/128* (2013.01); *F16D 65/847* (2013.01); *F16D 66/00* (2013.01); *B60T 2210/30* (2013.01); *B60T 2250/00* (2013.01); *B60T 2250/04* (2013.01);
(Continued)

(58) Field of Classification Search
CPC .......... B60T 1/087; B60T 1/065; B60T 8/171; B60T 17/221; B60T 5/00; B60T 2250/00; B60T 2210/30; B60T 2250/04; F16D 65/847; F16D 66/00; F16D 65/128; F16D 2065/787; F16D 2066/001; F16D 2065/1328; F16H 1/28
See application file for complete search history.

(56) References Cited

U.S. PATENT DOCUMENTS 9,416,834 B2    8/2016 O'Meachair

FOREIGN PATENT DOCUMENTS

| CN | 2668420 Y | 1/2005 |
| CN | 101712433 A | 5/2010 |

(Continued)

OTHER PUBLICATIONS

British Patent No. GB 2511610 to Kashyap published on Sep. 10, 2014.*

(Continued)

*Primary Examiner* — Pamela Rodriguez
(74) *Attorney, Agent, or Firm* — Jordan IP Law, LLC

(57) ABSTRACT

Apparatuses, systems, and methods apply, with a fan, a braking force to a vehicle that includes an axle. The fan is rotated at a first rotational speed based on a rotation of the axle that rotates at a second rotational speed. The first rotational speed is different from the second rotational speed. The fan applies the braking force when the fan rotates at the first rotational speed.

20 Claims, 12 Drawing Sheets

(51) Int. Cl.
*F16D 65/12* (2006.01)
*F16D 65/78* (2006.01)
*F16D 65/847* (2006.01)
*F16D 66/00* (2006.01)
*F16H 1/28* (2006.01)

(52) U.S. Cl.
CPC ............... *F16D 2065/1328* (2013.01); *F16D 2065/787* (2013.01); *F16D 2066/001* (2013.01); *F16H 1/28* (2013.01)

(56) References Cited

FOREIGN PATENT DOCUMENTS

| | | |
|---|---|---|
| CN | 203681140 U | 7/2014 |
| CN | 206504856 U | 9/2017 |
| CN | 111197629 A | 5/2020 |
| EP | 0461398 B1 | 9/1993 |
| GB | 902051 A * | 7/1962 |
| JP | 106113404 A | 9/1998 |
| KR | 20020088252 A | 11/2002 |

OTHER PUBLICATIONS

WO document No. WO 2022036985 to Zhang et al published on Feb. 24, 2022.*
www.aeronewstv.com/en/lifestyle/how-it-works/1774-aircraft-brake-cooling-fans.html, "Video—Aircraft brake cooling fans", published Apr. 24, 2014, 3 pages.

* cited by examiner

FAN TO DECELERATE VEHICLE AND PROVIDE COOLING TO FRICTION BRAKES

TECHNICAL FIELD

Embodiments generally relate to an enhanced braking system for a vehicle to reduce a velocity of the vehicle. More particularly, embodiments relate to a braking system that includes a fan that operates as a brake and/or cooling system for a friction brake.

BACKGROUND

Automotive vehicles may include friction brakes. For example, a friction brake may intentionally generate friction between a moving (e.g., a rotor attached to a wheel) and a stationary part (e.g., a brake pad) of brake to decelerate a vehicle. While the generated friction may decelerate the vehicle, the friction also generates a significant amount of heat. The heat may be absorbed by the friction brakes and surrounding components causing degradation of the components and the friction brakes. Moreover, the friction causes the moving and stationary parts of the brake to naturally degrade over time. For example, brake pads of the friction brake may wear with each use and reduce in size to the point of being inefficient and needing replacement.

BRIEF SUMMARY

In some embodiments, a braking system includes a fan that applies a braking force to a vehicle when the fan rotates, and a gearset that is coupled with the fan and an axle of the vehicle to rotate the fan at a first rotational speed based on a rotation of the axle that rotates at a second rotational speed. The first rotational speed is different from the second rotational speed and the fan applies the braking force when the fan rotates at the first rotational speed.

In some embodiments, at least one computer readable storage medium includes a set of instructions, which when executed by a computing device, cause the computing device to determine whether a predetermined condition is met to apply a braking force to a vehicle with a fan, wherein the vehicle includes an axle, and when the predetermined condition is met, control the fan to rotate at a first rotational speed based on a rotation of the axle that rotates at a second rotational speed. The first rotational speed is different from the second rotational speed, and the fan applies the braking force when the fan rotates at the first rotational speed.

In some embodiments, a method operates a braking system. The method includes applying, with a fan, a braking force to a vehicle that includes an axle, and rotating the fan at a first rotational speed based on a rotation of the axle that rotates at a second rotational speed. The first rotational speed is different from the second rotational speed, wherein the fan applies the braking force when the fan rotates at the first rotational speed.

BRIEF DESCRIPTION OF THE SEVERAL VIEWS OF THE DRAWINGS

The various advantages of the embodiments of the present application will become apparent to one skilled in the art by reading the following specification and appended claims, and by referencing the following drawings, in which:

DETAILED DESCRIPTION

Figure 1A:
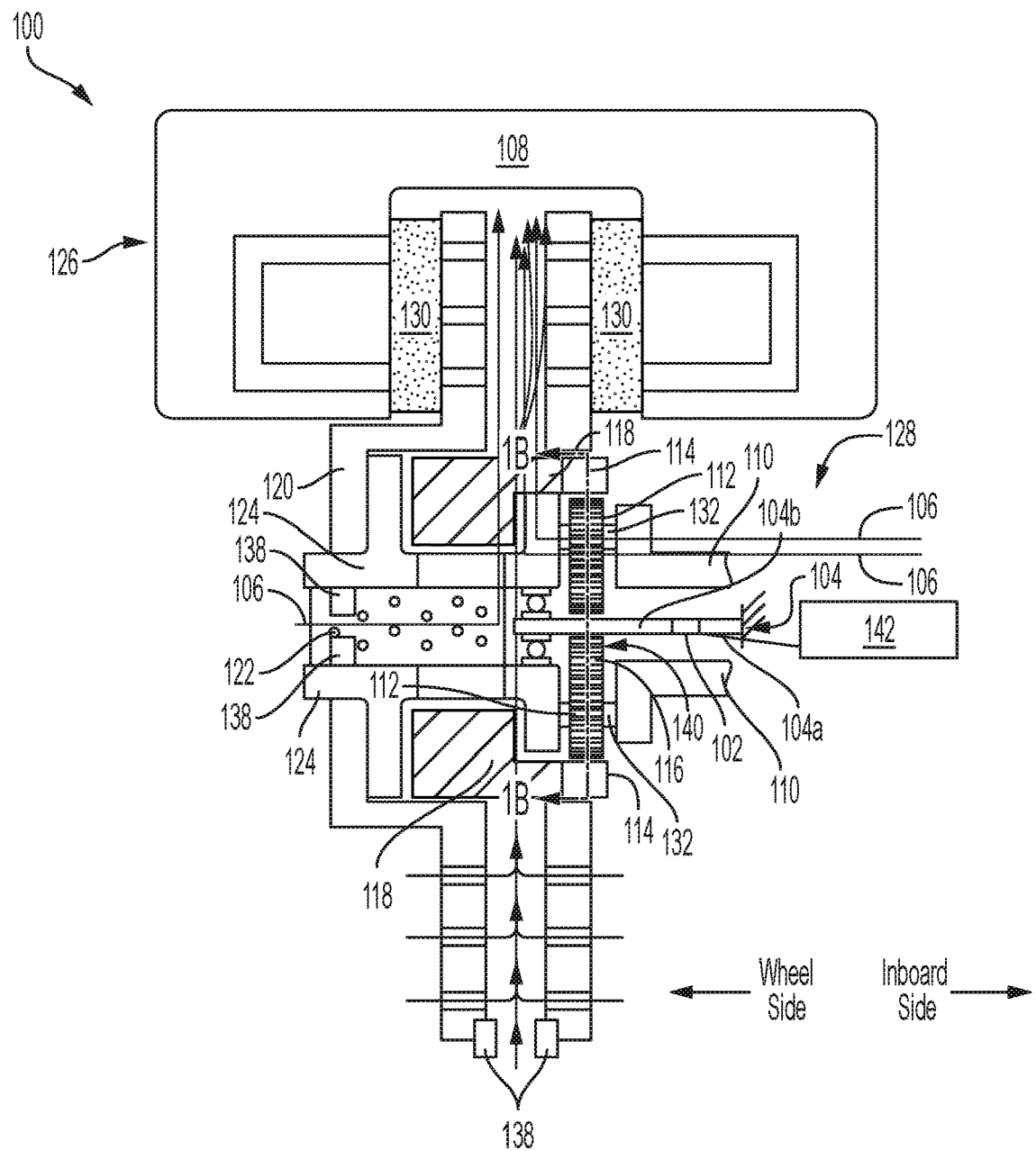
FIGS. 1A and 1B are diagrams of an example of a braking system in a first operation mode according to an embodiment.

FIG. 1A illustrates an example of a braking system 100 of a vehicle. The braking system 100 includes a fan braking system 128 and a friction braking system 126. The fan braking system 128 may include fan 118 that is rotatable in a first operation mode and inside of a wheel hub 124 to apply a braking force to the vehicle to decelerate the vehicle. The fan braking system 128 may be operable to augment and/or replace a braking force of the friction braking system 126 to slow the vehicle. Thus, the friction braking system 126 may reduce and/or altogether bypass applying a braking force to the vehicle. In doing so, a lifespan of the friction braking system 126 may be increased since the friction braking system 126 experiences reduced usage over a period of time to correspondingly reduce wear of components of the friction braking system 126. Furthermore, the friction braking system 126 may experience reduced average temperatures since the amount of friction applied by the friction brake system 126 may be reduced. Thus, the fan braking system 128 may selectively generate turbulence and a drag force to decelerate the vehicle rather than relying solely on the friction braking system 126 to decelerate the vehicle.

Furthermore, in some embodiments, the fan braking system 128 may apply a fluid (e.g., air) to clean the friction brake system 126 (e.g., remove dust) and control and reduce a temperature of the friction brake system 126. Thus, the braking system 100 may prolong a lifespan of the friction braking system 126 by reducing an overall operational temperature of the friction braking system 126. For example, the friction brake system 126 may be kept within a desired operational temperature range and below a temperature threshold to reduce and/or bypass damage from excessive heating.

In further detail, the braking system 100 includes a brake caliper 108 that presses a brake pad 130 against the rotors 120 to create friction. The rotors 120 may be attached to a wheel of the vehicle. A rotation of the wheels may be slowed by the friction to correspondingly reduce a velocity of the vehicle. The brake pads 130 may have a lifespan that corresponds to an amount of usage of the brake pads 130. Thus, reducing utilization of the brake pads 130 may increase a lifespan of the brake pads 130.

The fan braking system 128 may include a central shaft 104 and a gear system 140 (e.g., a gearset, an epicyclic gear train and/or planetary gear train). A first portion 104a of the central shaft 104 is fixed to be non-rotatable. A second portion 104b of the central shaft 104 is attached to a first gear 116 (e.g., a sun gear) of the gear system 140. When the fan braking system 128 is in the first operation mode to brake, a connecting system 102 may connect the first portion 104a to the second portion 104b so that the central shaft 104 is not rotatable. In the first operation mode, the fan braking system 128 is applying a significant braking force and thus the first portion 104a is connected with the second portion 104b.

As will be discussed in further detail below, a controller 142 controls the connecting system 102 to switch the fan braking system 128 between the first, a second and a third mode of operation. In the second mode of operation, the fan braking system 128 applies a light brake (e.g., less braking force than in the first operation mode). In the third operation mode, the fan braking system 128 does not apply a braking force. For example, when the fan braking system 128 is not braking, the connecting mechanism may disconnect the second portion 104b from the first portion 104a to bypass application of a braking force with the fan braking system 128.

The connecting system 102 may be various types. For example, the connecting system 102 may be similar in structure to a clutch or a torque converter. For example, the connecting system 102 may connect the first and second portions 104a, 104b and decouple the first and second portions 104a, 104b from each other. Additionally, the connecting system 102 is operable to connect the second portion 104b to a shaft and/or portion of the axle 110 so that the second portion 104b and the axle 110 can be locked together and spin at the same speed.

The gear system 140 may further include a plurality of second gears 112 (e.g., planet gears). The second gears 112 mesh with the first gear 116 to rotate and roll around the first gear 116. A third gear 114 (e.g., a ring gear) is disposed outside of the second gears 112 and meshes with the second gears 112. The second gears 112 may further roll inside the third gear 114 and mesh with the third gear 114. The second gears 112 may thus rotate about the first gear 116 and rotate the third gear 114. The third gear 114 may be connected with a fan 118 (e.g., a centrifugal fan and/or erg fan). Thus, as the third gear 114 rotates, the fan 118 may also rotate based on the rotation of the third gear 114.

The second gears 112 may further be attached to a carrier 132. The carrier 132 may support the second gears 112 and connect the second gears 112 together. The carrier 132 is connected with the axle 110 (e.g., a wheel axle). The axle 110 may transfer engine power and torque from a transmission of the vehicle to the wheel. For example, the axle 110 may support and rotate the wheel (not illustrated). The carrier 132 may be connected with the axle 110 such that rotational force is transmitted from the axle 110 to the carrier 132 to cause the carrier 132 to rotate. The carrier 132 may thus be rotated when the axle 110 rotates. The carrier 132 may include shafts that penetrate and support the second gears 112 in central portions of the second gears 112.

As noted above, the second gears 112 are connected to the carrier 132. Rotation (e.g., a rotational force) from the carrier 132 is therefore transmitted to the second gears 112. For example, when the carrier 132 rotates, the second gears 112 may in turn rotate around the first gear 116 and cause the third gear 114 to rotate. The rotation of the third gear 114 causes the fan 118 to rotate.

Thus, as described above, the rotation (e.g., a rotational force) of the axle 110 is transmitted to the fan 118 via the gear system 140. The gear system 140 may transmit the rotation of the axle 110 in such a way that the fan 118 rotates at a greater rotational speed than the axle 110. Thus, the fan 118 may be driven by the axle 110.

Figure 1B:
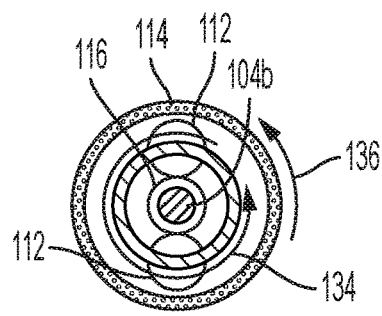

FIG. 1B is a more detailed side view (e.g., cross-sectional view) of the gear system 140 as shown along section or plane 1B-1B of FIG. 1A. The gear system 140 may be an epicyclic gear system that may have an epicyclic gear ratio that converts an input rotation, such as the rotation of the second gears 112, which are driven by rotation of the axle 110, into an output rotation, such as rotation of the third gear 114. For example, one rotation of the second gears 112 about the first gear 116 may result in a plurality of rotations of the third gear 114 about the first gear 116.

The ratio of input rotation to output rotation is dependent upon the number of teeth in each of the first, second and third gears 116, 112, 114 of the gear system 140, and upon which component is held stationary within the gear system 140. For example, the first gear 116 may have teeth that mesh with teeth of the second gears 112. The teeth of the second gears 112 also mesh with teeth of the third gear 114. As the second gears 112 spin (e.g., rotate about their own axes) and rotate about a central axis of the first gear 116, the second gears 112 may cause the third gear 114 to rotate.

Thus, the ratio may be controlled to increase the output rotation. Therefore, in the present example the third gear 114 rotates the fan 118 at a first rotational speed based on a rotation of the axle 110 that rotates at a second rotational speed. The first rotational speed may be different from the second rotational speed. For example, the first rotational speed may be greater than the second rotational speed.

In this example and in the first operation mode, the second gears 112 follow rotational path 134 around the first gear 116. The first gear 116 may be in a fixed state to be fixed by the shaft 104 to be non-rotatable. Thus, the second gears 112 may spin and rotate along rotational path 134 about a central axis of the first gear 116. Rotation of the axle 110 may cause the second gears 112 to spin and rotate. The rotation and spinning of the second gears 112 cause the third gear 114 to move along rotational path 136 at an increased rotational speed relative to the axle 110.

Therefore, the fan 118 may be rotated by the gear system 140 based on the rotation of the axle 110. When the fan 118 rotates in such a manner, the fan 118 applies a braking force to the vehicle. For example, as the fan 118 rotates, the fan 118 may generate a force on air as the air flows through the fan 118. The force may be a braking force that reduces the velocity of the vehicle. For example, the braking force may be directed in a direction to slow the vehicle. For example, the braking force may oppose a vehicle motion.

Therefore, the friction brake system 126 may not apply a braking force to decelerate the vehicle. Rather, the fan 118 may apply a braking force to decelerate the vehicle. In some embodiments, both the friction brake system 126 and fan 118 may apply braking forces to the vehicle. As a consequence, an amount of braking force applied by the friction brake system 126 may be reduced since the fan 118 also applies a braking force to the vehicle.

The fan 118 may also apply a cooling fluid 106 to the friction brake system 126 through cooling vanes in the rotor

120. For example, during operation, the friction brake system 126 may rapidly heat due to the friction between the brake pad 130 and the rotor 120. To reduce deleterious effects of the heat, the fan 118 may force cooling fluid 106 through the friction brake system 126 and through a filter 122. As illustrated, the cooling fluid 106 may be moved from both the inboard side (which may be underneath the vehicle) and the wheel side to the friction brake system 126. In some embodiments, the fluid 106 travels from a high pressure area underneath the vehicle, to a low pressure area outside the vehicle through the friction brake system 126.

Valves 138 may control the flow of the fluid 106. The valves may be closed to prevent and/or reduce the flow of the fluid 106 through the braking system 100. The passages of the fluid 106 may also remain open such that if the fan 118 is stopped, the fluid 106 may still flow. When the fan 118 rotates the velocity of the fluid 106 may increase to increase the cooling effect on the friction brake system 126.

Figure 1C:
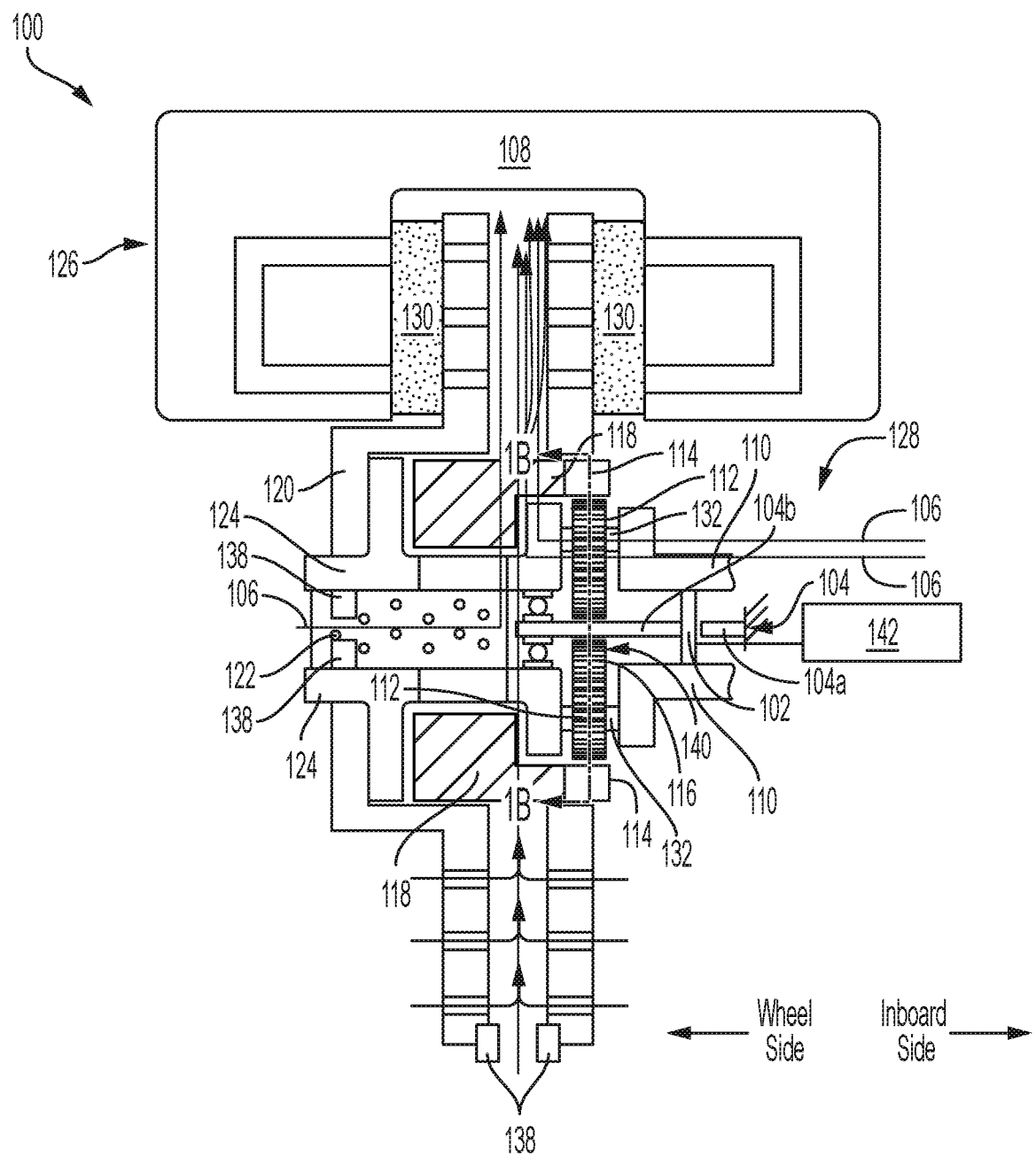
FIG. 1C is a diagram of an example of a braking system in a second operation mode according to an embodiment.

FIG. 1C illustrates the second mode of operation in which the fan 118 is applying a light braking force. In this example, first and second portions 104a, 104b of the central shaft 104 are not directly connected with each other. In detail, the controller 142 controls the connecting system 102 to disconnect the first and second portions 104a, 104b from each other so that the second portion 104b is rotatable and no longer fixed. In such embodiments, the connecting system 102 may connect the second portion 104b with the axle 110. Thus, rotation of the axle 110 may be transmitted to the first gear 116 via the second portion 104b to cause the first gear 116 to rotate. Thus, the first gear 116 may rotate based on a rotation of the axle 110. As noted above, the rotation of the axle 110 is also transmitted to the second gears 112 such that the second gears 112 also rotate based on the rotation of the axle 110. For example, the first gear 116 and the second gears 112 may co-rotate (e.g., rotate at similar or a same rotational speeds). Doing so may cause the second gears 112 to rotate about the first gear 116 while minimizing spinning of the second gears 112. The rotation of the second gears 112 may thus cause the carrier 132 to rotate and spin the fan 118 at a reduced speed wince the second gears 112 no longer spin. Doing so causes the fan 118 to co-rotate with the axle 110 which reduces braking forces applied by the fan 118 to lightly apply a brake. Thus, in some embodiments, the controller 142 controls the connecting system 102 so that first and second gears 112, 116 co-rotate based on the rotation of the axle 110.

Figure 1D:
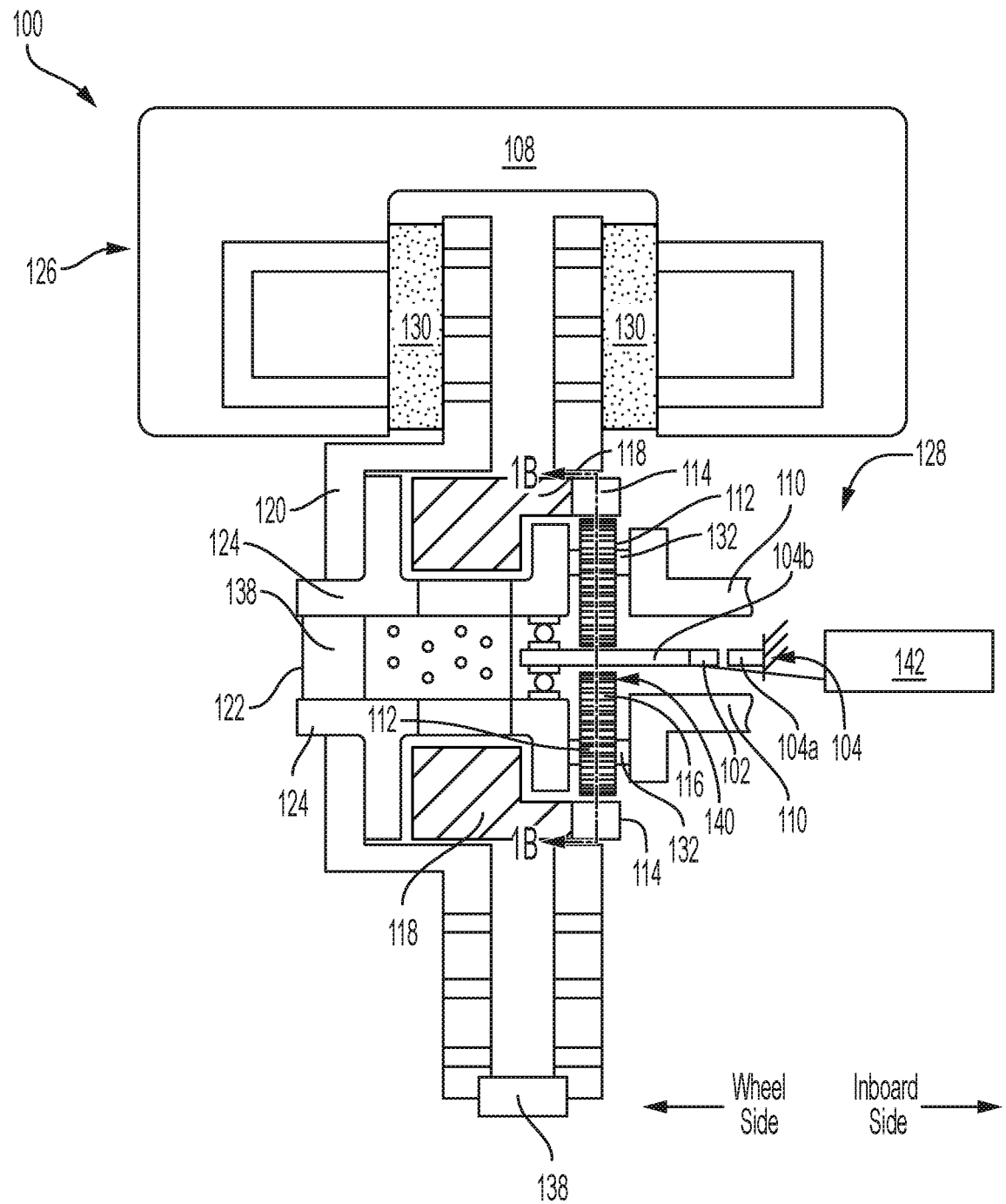
FIG. 1D is a diagram of an example of a braking system in a third operation mode according to an embodiment.

Turning now to FIG. 1D, the third mode of operation may be implemented in which the fan 118 is inhibited from rotation. For example, the controller 142 may control the connecting system 102 to decouple the second portion 104b from the first portion 104a. Rather than connecting the second portion 104b to the axle 110, the controller 142 may leave the second portion 104b to be free, decoupled and not fixed to another component aside from the first gear 116. The controller 142 may also decouple the carrier 132 from the axle 110 to prevent the second gears 112 from rotating and/or spinning. In this example, rotation of the axle 110 may not have an effect on the second gears 112 or the first gear 116 to reduce and/or eliminate rotation of the fan 118.

In order to reduce and/or prevent the fan 118 to move based on a flow of fluid 106, valves 138 may close to inhibit and/or eliminate fluid flow through the braking system 100. Thus, in some embodiments the second gears 112 may be decoupled from the axle 110 to eliminate any rotation and/or spinning of the second gears 112 based on the rotation of the axle 110.

As already discussed, the fan braking system 128 may be placed into several different operation modes: 1) First operation mode (e.g., heavy braking) in which the second portion 104b is coupled with the first portion 104a to be fixed and non-rotational so that the fan braking system 128 applies a braking force (e.g., FIGS. 1A and 1B); 2) Second operation mode (e.g., a light braking mode) in which the second portion 104b is connected with the axle 110 to co-rotate with the axle 110 so that the fan braking system 128 applies a light brake force (e.g., FIG. 1C); and 3) Third operation mode (e.g., a non-braking mode) in which the first portion 104a and/or carrier 132 is disconnected from the axle 110 with the fluid 106 being blocked from entry into the fan 118 so that the fan braking system 128 bypasses application of any braking force (FIG. 1D). It is worthwhile to note that the fan 118 spins at a fastest rotational speed in the first operation mode to apply the heavy braking force, a slower speed (relative to the first operation mode) in the second operation mode to apply a light braking force, and does not spin or is nearly stationary in the third operation mode to apply no braking force.

In some embodiments, the controller 142 controls the connecting system 102 to switch between the above first, second and third operation modes. The controller 142 may be implemented in logic instructions (e.g., software), configurable logic, fixed-functionality hardware logic, circuitry, etc., or any combination thereof. In some embodiments, system 100 includes at least one non-transitory computer readable storage medium that comprises a set of instructions, which when executed by a computing device, causes the computing device to implement aspects of the controller 142.

In the first operation mode (e.g., braking mode) the first gear 116 (e.g., sun) may be fixed and the fan 118 spins faster than the axle 110. The second operation mode may be a light braking mode in which the first gear 116 is coupled to the axle 110 and the fan 118 spins at same speed as axle 110. In the third operation mode, (e.g., a driving mode) the first gear 116 and/or the carrier 132 are not fixed to anything. Furthermore, the fan 118 may be stopped mechanically by shutting off the air flow to stop the fluid 106 from flowing through the fan 118.

In some embodiments, the controller 142 determines whether a predetermined condition is met to apply a braking force to the vehicle with the fan 118. When the predetermined condition is met, the controller 142 may controls the connecting system 102 to operate the fan braking system 128 in the first operation mode to rotate at a first rotational speed based on a rotation of the axle 110 that rotates at a second rotational speed. The first rotational speed is different from the second rotational speed such that the fan 118 applies the braking force when the fan 118 rotates at the first rotational speed. When the predetermined condition is not met, the controller 142 controls the fan braking system 128 to operate in the second or third operation modes to one or more of bypass, reduce or eliminate the braking force. Various predetermined conditions will be discussed with respect to FIGS. 2-7.

In some examples, the controller 142 may engage the first operation mode in response to a braking force request (as determined from a depression of a brake pedal for example or other requesting device) exceeding a dynamically adjustable first braking threshold. In some examples, the controller 142 may engage the first operation mode in response to a determination that an estimated or a measured brake temperature exceeds a dynamically adjustable first temperature threshold. In some examples, the first braking and temperature thresholds may be determined and adjusted based on speed, ambient or estimated/measured brake temperature, road grade, or estimated brake wear and are thus adjustable. Therefore, the first braking and first temperature thresholds may change based on various operating conditions. In some examples, the first operation mode is activated by an automated braking controller (ADAS or autonomous system). For example, the controller 142 may be an automated braking controller.

In some examples, the controller 142 may engage the second operation mode similarly to as described above with respect to the first operation mode, but at reduced thresholds. For example, the controller 142 may engage the second operation mode in response to a braking force request exceeding a dynamically adjustable second braking threshold. In some examples, the controller 142 may engage the second operation mode in response to a determination that an estimated or a measured brake temperature exceeds a dynamically adjustable second temperature threshold. In some examples, the second braking and temperature thresholds above may be determined and adjusted based on speed, ambient or estimated/measured brake temperature, road grade, or estimated brake wear and are thus adjustable. Thus, the second braking and temperature thresholds may change based on various operating conditions. In this example, second braking threshold is lower than the first braking threshold, and the second temperature threshold is lower than the first temperature threshold. The controller 142 may also engage the second operation mode if a failure in the fan braking system 128 and/or fan 118 is detected to prevent rotation of the fan 118 relative to the central shaft 104.

The controller 142 may engage the third operation mode as the default mode of operation to reduce drag, and when the conditions for the first and second operation modes of engagement are not met. Thus, the third mode of operation mode may be the default mode of operation.

In some embodiments, the location of the fan braking system 128 is modified to be located in another portion of the vehicle and distal from the friction brake system 126. For example, as will be described below with respect to FIG. 8, the fan braking system 128 may be modified to be located proximate a differential and/or transmission of the vehicle. In doing so, the fan braking system 128 may be increased in size, but have limited capability to cool the friction brake system 126. Thus, a size of the fan 118 (e.g., radius and/or blade size) may be increased by moving the fan braking system 128 farther away from the friction braking system 126.

Figure 2:
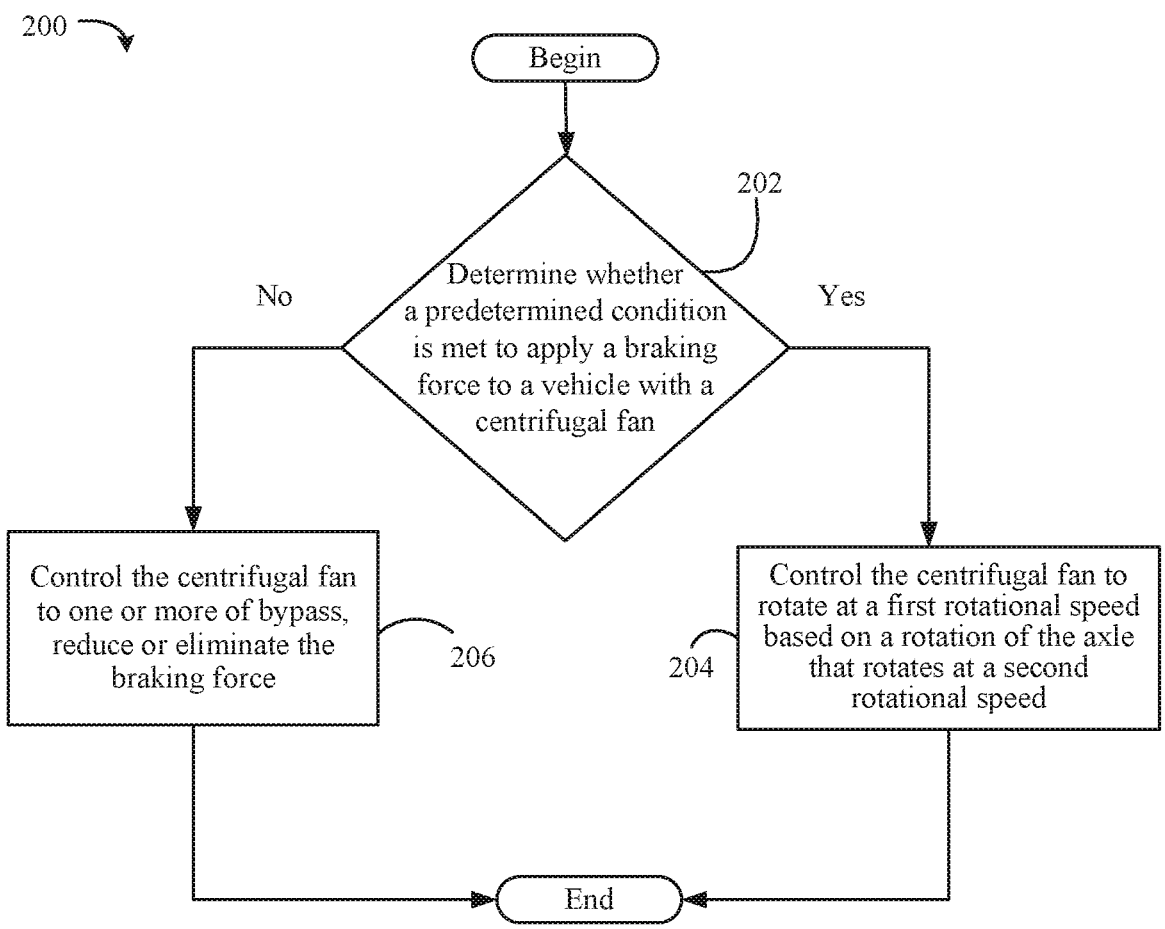
FIG. 2 is a flowchart of an example of a method of detecting a condition and controlling fan to apply a braking force according to an embodiment.

FIG. 2 shows a method 200 of detecting a condition and controlling fan to apply a braking force to a vehicle. The method 200 may generally be implemented in conjunction with any of the embodiments described herein, for example the of FIG. 1 and/or the braking system 100 of FIG. 1. In an embodiment, the method 200 is implemented in logic instructions (e.g., software), configurable logic, fixed-functionality hardware logic, circuitry, etc., or any combination thereof. Method 200 may be implemented by the controller 142 (FIGS. 1A and 1B) described above.

Illustrated processing block 202 determines whether a predetermined condition is met to apply a braking force to the vehicle with a centrifugal fan. When the predetermined condition is met, illustrated processing block 204 controls the fan to rotate at a first rotational speed based on a rotation of an axle that rotates at a second rotational speed. The first rotational speed is different from the second rotational speed such that the fan applies the braking force when the fan rotates at the first rotational speed. When the predetermined condition is not met, illustrated processing block 206 controls the fan to one or more of bypass, reduce or eliminate the braking force.

Figure 3:
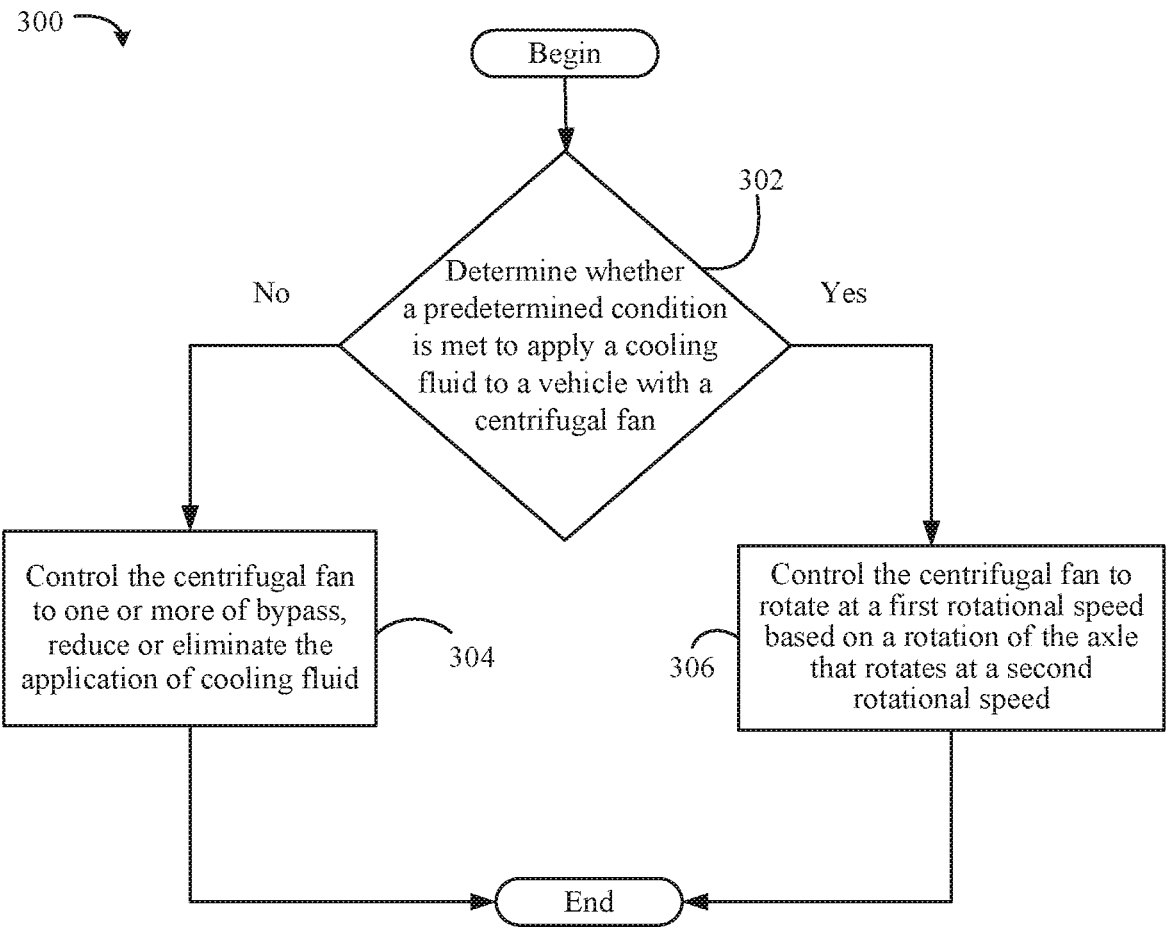
FIG. 3 is a flowchart of an example of a method of detecting a condition and controlling fan to apply a cooling liquid to a vehicle according to an embodiment.

FIG. 3 shows a method 300 of detecting a condition and controlling fan to apply a cooling liquid to a vehicle. The method 300 may generally be implemented in conjunction with any of the embodiments described herein, for example the of FIG. 1 and/or the braking system 100 of FIG. 1. In an embodiment, the method 200 is implemented in logic instructions (e.g., software), configurable logic, fixed-functionality hardware logic, circuitry, etc., or any combination thereof. Method 300 may be implemented by the controller 142 (FIGS. 1A and 1B) described above.

Illustrated processing block 302 determines whether a predetermined condition is met to apply a cooling liquid to the vehicle (e.g., a frictional brake) with the fan. When the predetermined condition is met, illustrated processing block 306 controls the fan to rotate at a first rotational speed based on a rotation of an axle that rotates at a second rotational speed. The first rotational speed is different from the second rotational speed such that the fan applies the cooling fluid force when the fan rotates at the first rotational speed.

When the predetermined condition is not met, illustrated processing block 206 controls the fan to one or more of bypass, reduce or eliminate the application of the cooling liquid. In some embodiments, the fan is controlled to eliminate the transmission of rotational force from the axle to the fan, and/or permit the fan to rotate freely.

Figure 4:
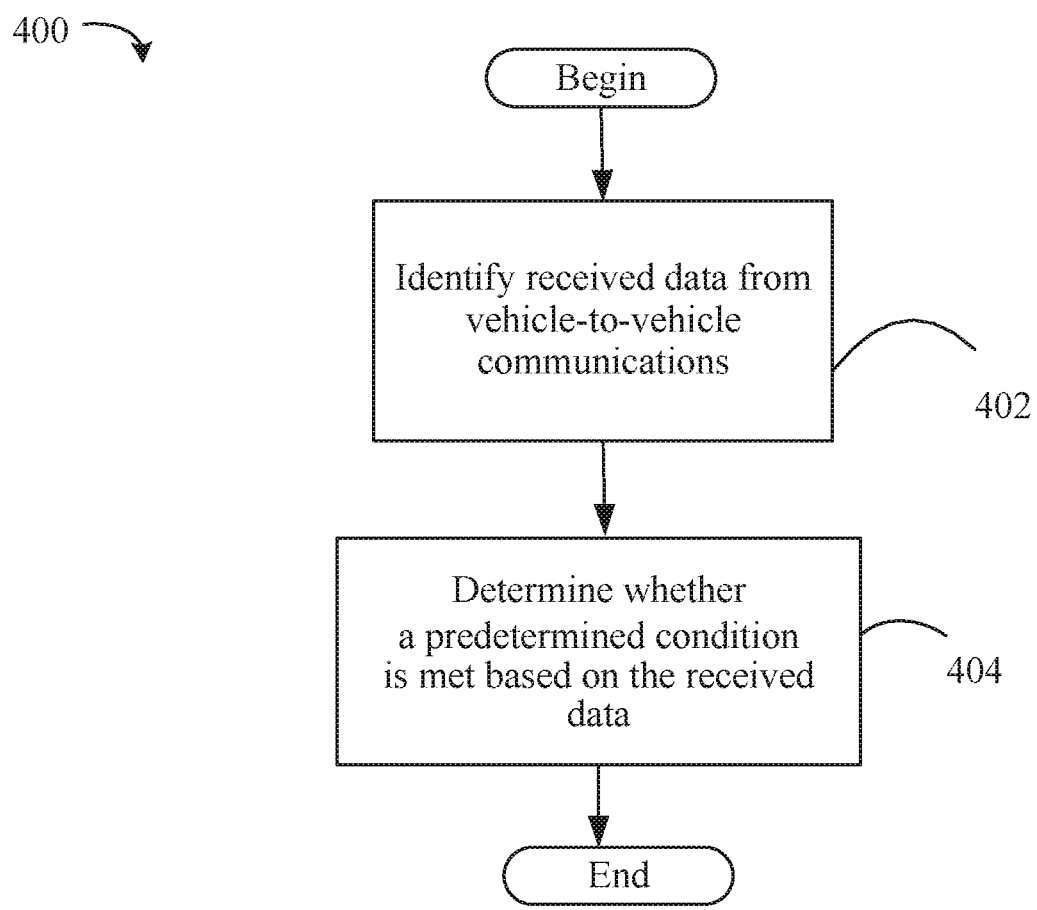
FIG. 4 is a flowchart of an example of a method of detecting a condition from vehicle-to-vehicle (V2V) communications according to an embodiment.

FIG. 4 shows a method 400 of detecting a condition from vehicle-to-vehicle (V2V) communications to control a fan to apply a braking force to a vehicle and/or cooling liquid to a brake of the vehicle. The method 400 may generally be implemented in conjunction with any of the embodiments described herein, for example the of FIG. 1 and/or the braking system 100 of FIG. 1. In an embodiment, the method 400 is implemented in logic instructions (e.g., software), configurable logic, fixed-functionality hardware logic, circuitry, etc., or any combination thereof. Method 400 may be implemented by the controller 142 (FIGS. 1A and 1B) described above.

Illustrated processing block 402 identifies received data from V2V communications. Illustrated processing block 404 determines whether a predetermined condition is met based on the received data. The V2V communications may indicate that a braking condition is probable. For example, if the V2V communications indicate that other vehicles proximate the vehicle and/or ahead of the vehicle are braking, the predetermined condition may be deemed to be met. Other V2V conditions may be identified, such as sensor readings of other vehicles associated with a braking condition. For example, if the sensor readings indicate that a descent will occur shortly (e.g., downhill roadway), the predetermined condition may be deemed met. The sensor data may include image data, temperature data, etc. Thus, the fan may be controlled to apply a braking force and/or a cooling liquid to the frictional brakes.

Some embodiments may also identify environmental factors using V2V communications. In some embodiments, the V2V communications may include shared data, crowd-source data, etc. that is shared between vehicles on a roadway. For example, vehicles equipped with network capabilities may participate in V2V communications.

Figure 5:
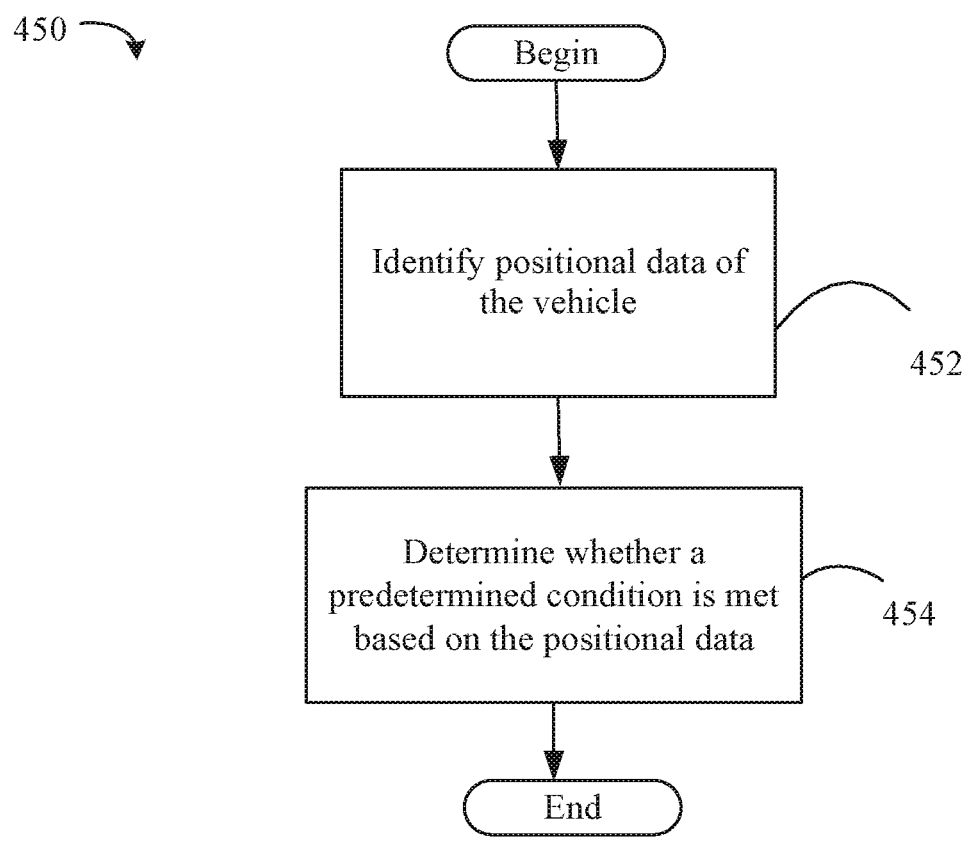
FIG. 5 is a flowchart of an example of a method of detecting a condition from positional data according to an embodiment.

FIG. 5 shows a method 450 of detecting a condition from positional data to control a fan to apply a braking force to a vehicle and/or cooling liquid to a brake of the vehicle. The method 450 may generally be implemented in conjunction with any of the embodiments described herein, for example the braking system 100 of FIG. 1. In an embodiment, the method 450 is implemented in logic instructions (e.g., software), configurable logic, fixed-functionality hardware logic, circuitry, etc., or any combination thereof. Method 450 may be implemented by the controller 142 (FIGS. 1A and 1B) described above.

Illustrated processing block 452 identifies positional data of the vehicle. For example, a Global Positioning System (GPS) and navigational interface may map a future course of the vehicle based on a current position. Illustrated processing block 454 determines whether a predetermined condition is met based on the positional data. For example, the future course may correspond to a high likelihood of needing a brake (e.g., low velocity zone, downhill descent, etc.). The predetermined condition is deemed to be met when the future course may correspond to a high likelihood of needing a brake.

Thus, some examples may integrate GPS technology, mapping and navigational data of the vehicle so that the vehicle anticipates potential spikes in brake temperature and/or future braking operations. For example, the vehicle, particularly when equipped with GPS, may identify where a vehicle is and what path the vehicle will be traveling on to reach a desired destination. Thus, the vehicle can prepare for hilly, steep, curved, etc. roads by activating the fans to begin braking operations and cooling of friction brakes to minimize corrosion and usage of the friction brakes.

Figure 6:
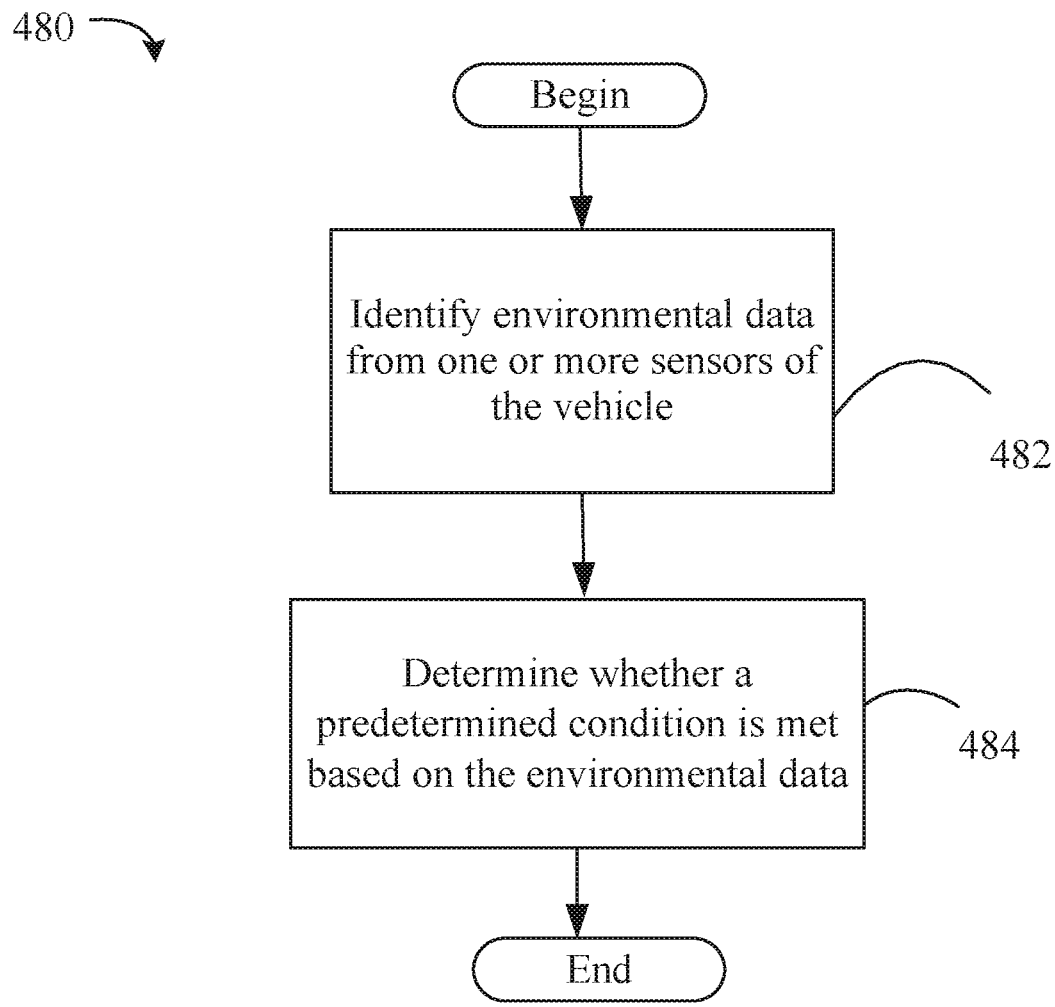
FIG. 6 is a flowchart of an example of a method of detecting a predetermined condition from environmental data according to an embodiment.

FIG. 6 shows a method 480 of detecting a predetermined condition from environmental data to control a fan to apply a braking force to a vehicle and/or cooling liquid to a brake of the vehicle. The method 480 may generally be implemented in conjunction with any of the embodiments described herein, for example the of FIG. 1 and/or the braking system 100 of FIG. 1. In an embodiment, the method 480 is implemented in logic instructions (e.g., software), configurable logic, fixed-functionality hardware logic, circuitry, etc., or any combination thereof. Method 480 may be implemented by the controller 142 (FIGS. 1A and 1B) described above.

Illustrated processing block 482 identifies environmental data from one or more sensors of the vehicle. The environmental data may include image data, temperature readings, proximity sensor data, etc. Illustrated processing block 484 determines whether a predetermined condition is met based on the environmental data. For example, if the temperature readings indicate that the ambient temperature is above at threshold, the fan may be controlled to apply cooling liquid to the friction brakes. In some examples, if the proximity sensor data and/or image data indicates that an object is within a predetermined distance and/or travelling below a safe velocity, the predetermined condition may be deemed to be met to brake the vehicle.

Some embodiments may identify the predetermined condition based on environmental factors that may influence brake temperature. Such environmental factors may include altitude of the vehicle, a velocity, acceleration and/or speed of the vehicle, and road conditions that the vehicle is experiencing or is likely to experience. Based on different external, environmental factors, the vehicle may use data stored in a cloud to adjust usage of the fan brake and the fan to applying cooling fluids to a friction brake for a particular threshold temperature.

Figure 7:
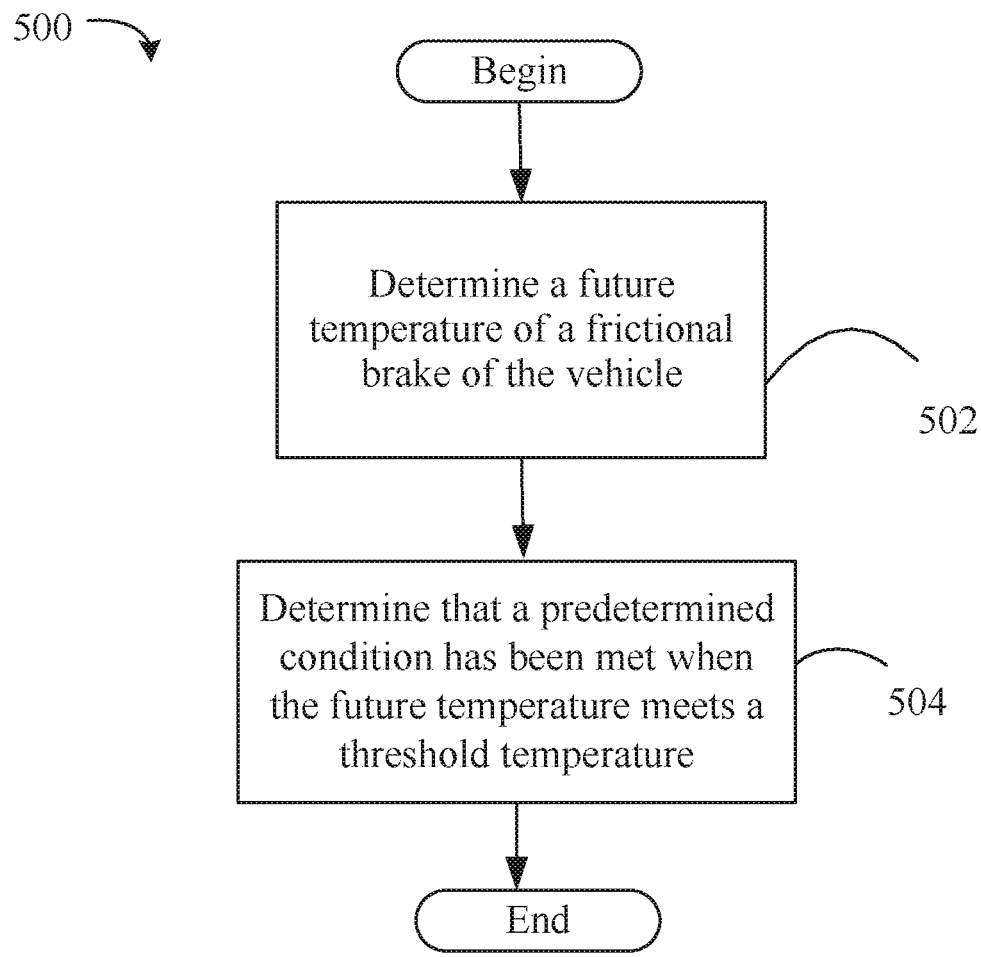
FIG. 7 is a flowchart of an example of a method of detecting a future temperature of the frictional brake according to an embodiment.

FIG. 7 shows a method 500 of detecting a future temperature of the frictional brake to control fan to apply cooling liquid to a brake of the vehicle. The method 500 may generally be implemented in conjunction with any of the embodiments described herein, for example the of FIG. 1 and/or the braking system 100 of FIG. 1. In an embodiment, the method 500 is implemented in logic instructions (e.g., software), configurable logic, fixed-functionality hardware logic, circuitry, etc., or any combination thereof. Method 480 may be implemented by the controller 142 (FIGS. 1A and 1B) described above.

Illustrated processing block 502 determines a future temperature of the frictional brake. For example, the method 500 includes detecting how rapidly the brake temperature is changing (e.g., a derivate of the temperature) to extrapolate a future temperature of the frictional brake. Illustrated processing block 504 determines that a predetermined condition has been met when the future temperature meets a threshold temperature.

Figure 8:
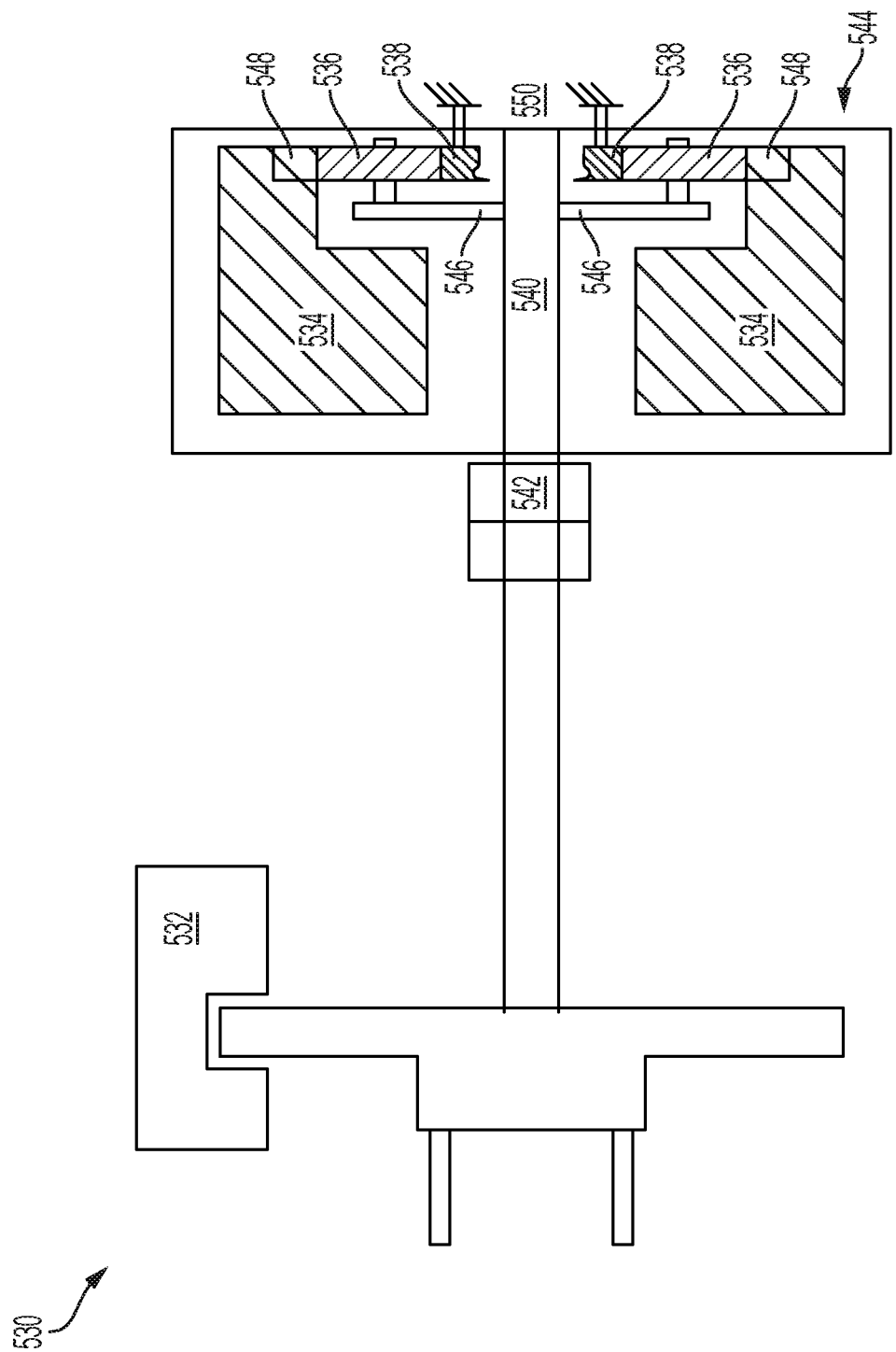
FIG. 8 is a diagram of an example of a braking system disposed distal from a friction brake according to an embodiment.

FIG. 8 shows a vehicle 530 that includes a friction brake 532. The vehicle 530 includes an axle 540 that includes a continuously variable joint 542. The vehicle 530 includes a fan brake system 544. The fan braking system 544 is positioned away from the friction brake 532 and proximate transmission 550. By modifying the position of the fan braking system 544 to be positioned away from the friction brake 532, the fan braking system 544 may be increased in size relative to placing the fan braking system 544 proximate the friction brake 532.

The fan braking system 544 may be coupled to the axle 540 similarly as described above with respect to the embodiments of FIG. 1. For example, a first gear 538 (e.g., a sun gear) may be operated in a first operation mode (described above) to be fixed and non-rotatable. A second gears 536 (e.g., planet gears) may be coupled with the axle 540 via connecting mechanism 546. A fan 534 (e.g., centrifugal fan) may be connected with a ring 548. The ring 548 may be rotated by the second gears 536 to rotate the fan 534. The fan braking system 544 may also include a carrier (not illustrated) coupled with the second gears 536.

Figure 9:
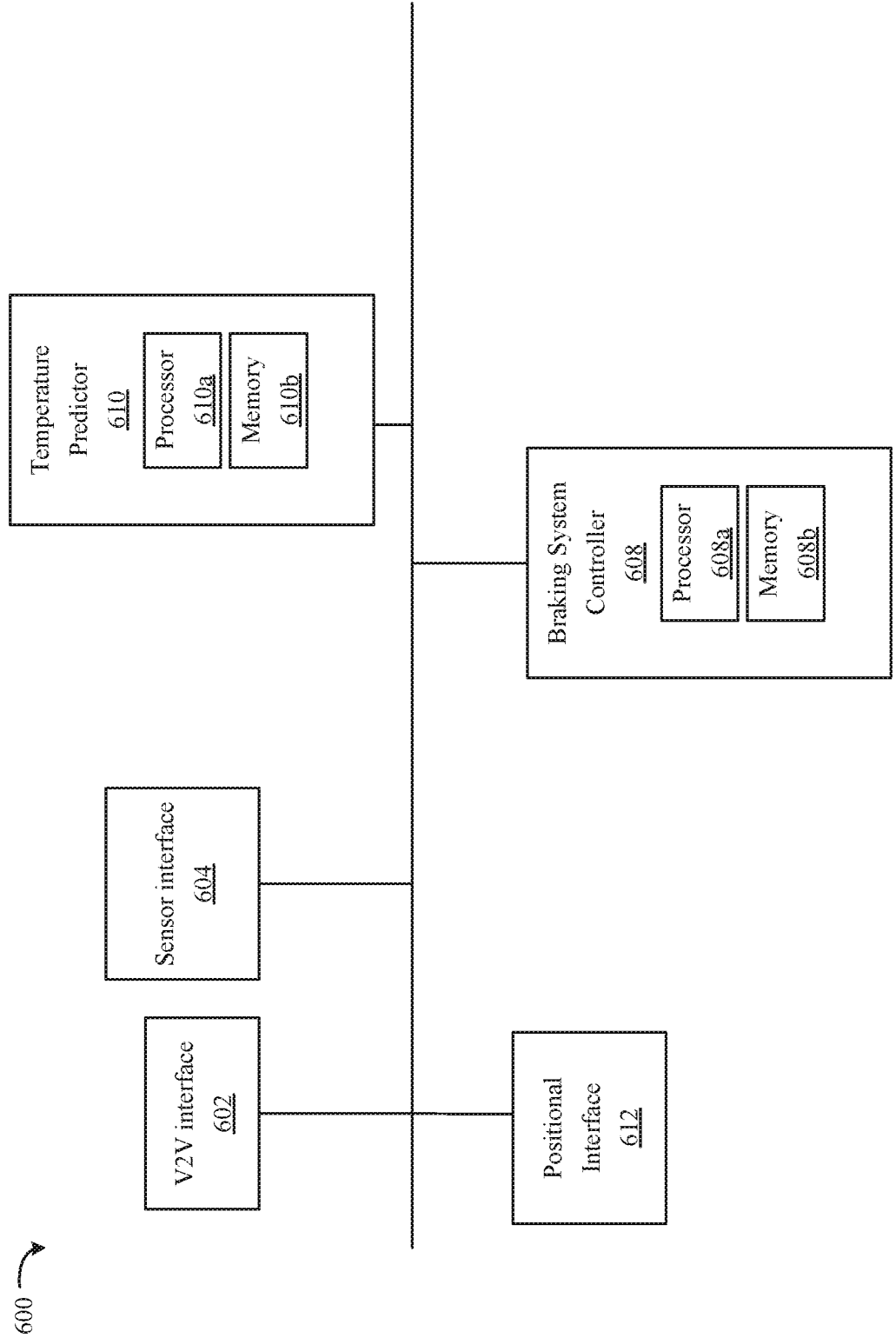
FIG. 9 is a diagram of an example of a control system according to an embodiment.

FIG. 9 shows a more detailed example of a control system 600 of a computing device to control a fan of a vehicle between the first, second and third operation modes. The illustrated control system 600 may be readily implemented in controller 142 (FIGS. 1A and 1B) and may implement any of the other methods and/or processes discussed herein.

In the illustrated example, the system 600 may include a V2V interface 602. The V2V interface 602 may allow for communications between the vehicle and other vehicles to retrieve data from the other vehicles. The V2V interface 602 may operate over various wireless and/or wired communications. The system 600 may further include a positional interface 612 that retrieves positional data (e.g., GPS coordinates and/or future navigation directions) of the vehicle. The system 600 may also include a sensor interface 604 to retrieve sensor data associated with the vehicle. The system 600 may also include a temperature predictor 610 that predicts a future braking temperature of a frictional brake of the vehicle. The temperature predictor 610 may include a processor 610a (e.g., embedded controller, central processing unit/CPU, circuitry, etc.) and a memory 610b (e.g., non-volatile memory/NVM and/or volatile memory) containing a set of instructions, which when executed by the processor 610a, cause the temperature predictor 610 to predict the temperature as described herein.

The system 600 may also include a braking system controller 608 that controls a fan brake to operate in one of the first, second and third operation modes described above. Additionally, the braking system controller 608 may include a processor 608a (e.g., embedded controller, central processing unit/CPU, circuitry, etc.) and a memory 608b (e.g., non-volatile memory/NVM and/or volatile memory) containing a set of instructions, which when executed by the processor 608*a*, cause the braking system controller 608 to control the fan brake as described herein.

Figure 10:
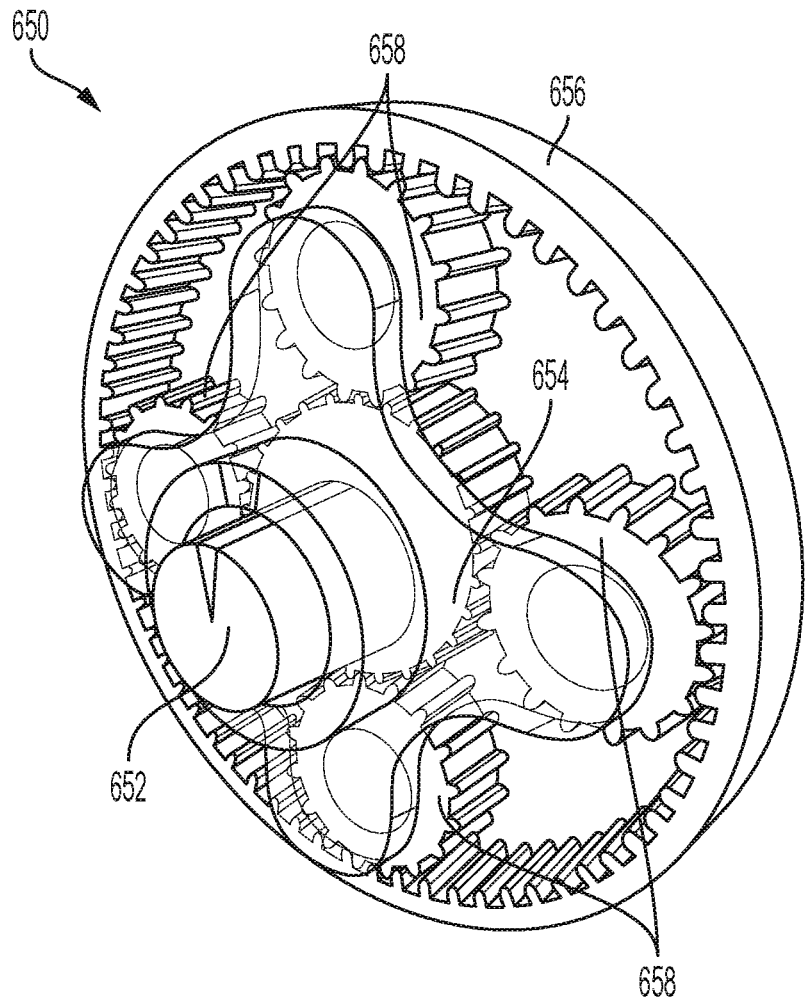
FIG. 10 is a block diagram of an example of an epicyclic gear set according to an embodiment.

FIG. 10 illustrates an example of an epicyclic gear set 650. The epicyclic gear set 650 includes a sun gear 652, a carrier 654, planetary gears 658 and a ring gear 656.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present examples can be implemented in a variety of forms. Therefore, while the embodiments of this example have been described in connection with particular examples thereof, the true scope of the embodiments of the example should not be so limited since other modifications will become apparent to the skilled practitioner upon a study of the drawings, specification, and following claims.

We claim:

1. A braking system comprising:
   a fan that applies a braking force to a vehicle when the fan rotates; and
   a gearset that is coupled with the fan and an axle of the vehicle to rotate the fan at a first rotational speed based on a rotation of the axle that rotates at a second rotational speed, wherein the first rotational speed is different from the second rotational speed, wherein the fan applies the braking force when the fan rotates at the first rotational speed.

2. The braking system of claim 1, wherein the gearset is an epicyclic gear train.

3. The braking system of claim 2, wherein the epicyclic gear train includes:
   a central shaft;
   a first gear supported on the central shaft;
   one or more second gears that are rotatable around the first gear; and
   a connecting system connected with the central shaft to switch the first gear between a rotatable state and a fixed state.

4. The braking system of claim 3, wherein the connecting system connects the central shaft to the axle to place the first gear in the rotatable state.

5. The braking system of claim 3, wherein:
   the connecting system fixes the central shaft to a portion of the vehicle to inhibit rotation of the central shaft to place the first gear in the fixed state,
   in the fixed state the fan rotates at the first rotational speed and the axle rotates at the second rotational speed.

6. The braking system of claim 3, wherein the epicyclic gear train includes:
   a ring gear that connects the one or more second gears to the fan.

7. The braking system of claim 1, wherein the first rotational speed is greater than the second rotational speed.

8. The braking system of claim 1, further comprising:
   a friction brake system that includes one or more rotors that include one or more cooling vanes,
   wherein the fan is a centrifugal fan, and
   wherein when the centrifugal fan rotates, the centrifugal fan transmits air through the one or more cooling vanes to cool the friction brake system.

9. At least one computer readable storage medium comprising a set of instructions, which when executed by a computing device, cause the computing device to:
   determine whether a predetermined condition is met to apply a braking force to a vehicle with a fan, wherein the vehicle includes an axle; and
   when the predetermined condition is met, control the fan to rotate at a first rotational speed based on a rotation of the axle that rotates at a second rotational speed, wherein the first rotational speed is different from the second rotational speed, wherein the fan applies the braking force when the fan rotates at the first rotational speed.

10. The at least one computer readable storage medium of claim 9, wherein the instructions, when executed, cause the computing device to:
    when the predetermined condition is not met, control the fan to operate to either bypass, reduce or eliminate the braking force.

11. The at least one computer readable storage medium of claim 9, wherein the instructions, when executed, cause the computing device to:
    identify received data from vehicle-to-vehicle communications; and
    determine whether the predetermined condition is met based on the received data.

12. The at least one computer readable storage medium of claim 9, wherein the instructions, when executed, cause the computing device to:
    identify positional data of the vehicle; and
    determine whether the predetermined condition is met based on the positional data.

13. The at least one computer readable storage medium of claim 9, wherein the instructions, when executed, cause the computing device to:
    identify environmental data from one or more sensors of the vehicle; and
    determine whether the predetermined condition is met based on the environmental data, wherein the environmental data includes one or more of an altitude of the vehicle, speed of the vehicle, or temperature of the vehicle.

14. The at least one computer readable storage medium of claim 9, wherein the instructions, when executed, cause the computing device to:
    determine a future temperature of a friction brake of the vehicle; and
    determine that the predetermined condition has been met when the future temperature meets a threshold temperature.

15. A method to operate a braking system comprising:
    applying, with a fan, a braking force to a vehicle that includes an axle; and
    rotating the fan at a first rotational speed based on a rotation of the axle that rotates at a second rotational speed, wherein the first rotational speed is different from the second rotational speed, wherein the fan applies the braking force when the fan rotates at the first rotational speed.

16. The method of claim 15, further comprising:
    switching the fan between a rotatable state and a fixed state.

17. The method of claim 16, further comprising:
    determining that a predetermined condition is met; and
    controlling the fan to be placed in in the rotatable state to apply the braking force in response to the predetermined condition being met.

18. The method of claim 17, further comprising:
controlling the fan to be placed in in the fixed state to bypass application of the braking force in response to the predetermined condition ceasing to be met.

19. The method of claim 15, further comprising:
connecting the fan to the axle via a gearset.

20. The method of claim 15, wherein the first rotational speed is greater than the second rotational speed.

* * * * *